No. 729,480. PATENTED MAY 26, 1903.
H. J. WOLFE.
COMBINED LEVEL AND ATTACHMENT.
APPLICATION FILED NOV. 19, 1901.
NO MODEL.
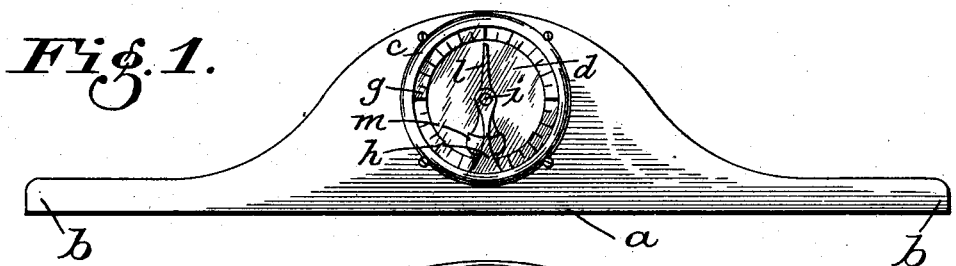
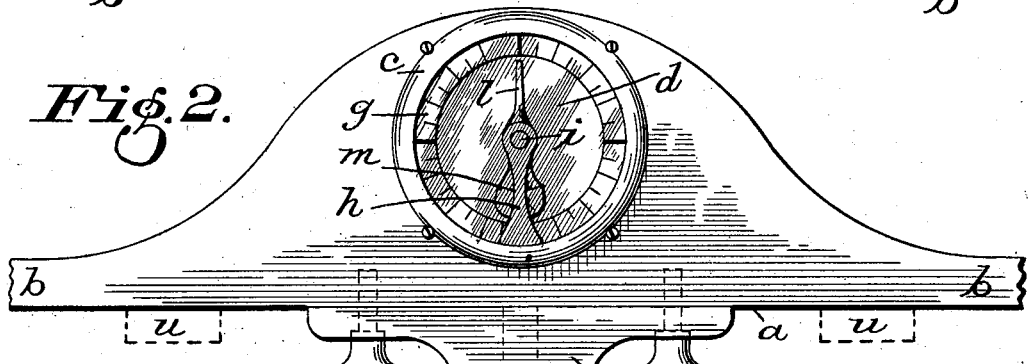
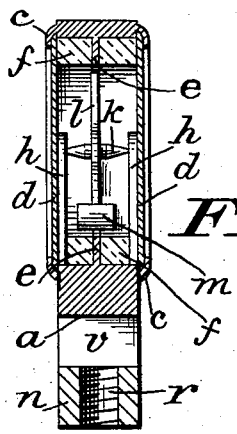
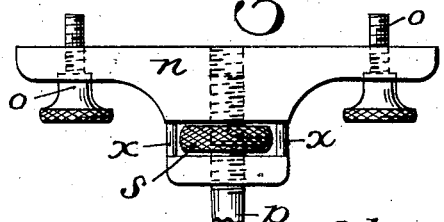
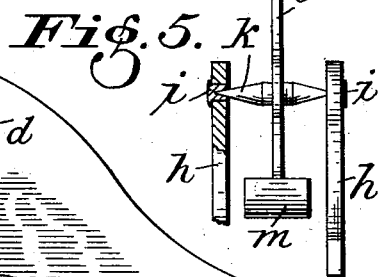
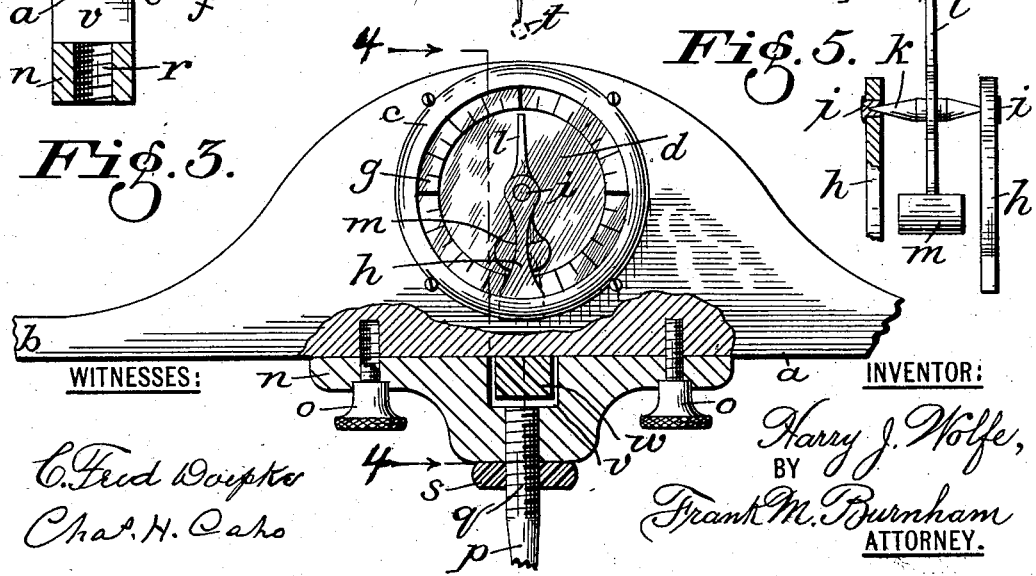
WITNESSES:
C. Fred Doepke
Chas. H. Oahs
INVENTOR:
Harry J. Wolfe,
BY Frank M. Burnham
ATTORNEY.
THE NORRIS PETERS CO., PHOTO-LITHO., WASHINGTON, D. C.

No. 729,480. Patented May 26, 1903.

UNITED STATES PATENT OFFICE.

HARRY J. WOLFE, OF DAYTON, OHIO.

COMBINED LEVEL AND ATTACHMENT.

SPECIFICATION forming part of Letters Patent No. 729,480, dated May 26, 1903.

Application filed November 19, 1901. Serial No. 82,822. (No model.)

*To all whom it may concern:*

Be it known that I, HARRY J. WOLFE, a citizen of the United States, residing at Dayton, in the county of Montgomery and State of Ohio, have invented certain new and useful Improvements in a Combined Level and Attachment; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that class of tools commonly called "levels" and which are used for obtaining or ascertaining the exact level of the surface, either as to a horizontal or perpendicular line, of any or all bodies or devices, whether large or small; but, as is well known, this result heretofore has been but very imperfectly accomplished or obtained.

The principal objects, therefore, sought and the advantages attained by my invention consist in so constructing a level that while it can be more readily and quickly handled will always act with more accuracy, as it is never effected by the temperature or atmospheric changes, thus giving more perfect results than "spirit-levels" and other like ordinary tools of this class in present use. While my improved level is particularly applicable to machine-shop work, it can also be used for any general purpose that a tool of this nature is adapted; but it is more especially designed and intended to be used in the construction of any and all classes of engines, and particularly locomotive-engines, by means of the attachment portion of my invention, which can be quickly and easily attached to the level proper when employed on this class of work.

Another and very important feature of my improved level consists in the employment of a graduated scale and a centrally-balanced hand or indicator, which will indicate the exact degree of inclination of the body or device to be leveled.

My invention consists, referring in general terms to its construction, of the level proper, which is provided with means for registering the exact degree or inclination of the body or device sought to be leveled, and it further consists in its construction of an attachment for engine-work, which consists of means for accurately ascertaining the level of the cylinders, either where there are four guides—two on each side—or where one main guide is employed, as will be more fully described hereinafter and pointed out in the subjoined claims.

Referring to the annexed drawings, illustrating my invention, and wherein the same letters of reference refer to the same parts wherever they occur throughout the several views, Figure 1 is a side view of my improved level when ready to be employed for general use. Fig. 2 is a side elevation of my combined level and attachment in operative position, as designed for engine-work. Fig. 3 is a view similar to Fig. 2 and partially in section, so as to more clearly show the manner of connecting the attachment. Fig. 4 is a vertical transverse sectional view taken on the line 4 4 of Fig. 3 with the main guide and pointer of the attachment removed. Fig. 5 is a detail view, partially in section and on a somewhat exaggerated scale, so as to show the centrally-balanced hand or indicator and its staff, which works loosely in the bushings of the supporting-standards; and Fig. 6 is a detail view of a modified form of the attachment, which may be used, if desired.

In describing my combined level and attachment and referring in detail to the different parts thereof, as shown throughout the various views of the accompanying drawings by means of the letters of reference as aforesaid, *a* refers to the base of the body of the level and which is intended to rest on the part to be leveled. *b* refers to the end extensions. The body of said level is formed with an opening which is provided on both sides alike (see Fig. 4) with a dial. Said dial comprises the bezel *c*, detachably connected to the body preferably by small screws, and the glass *d* or other transparent material may be used—such, for example, as mica—and which is retained in position by said bezel, thus preventing injury by dirt or otherwise to the parts located within said opening, and, as is clearly shown in Fig. 4, an internal flange *e* extends centrally around the opening, upon each side of which is located the annular portion *f*, composed of celluloid, compressed paper, or other like material, each having marked upon its outer face, so as to be plainly visible through said glass, as shown in Figs. 1, 2, and 3, a graduated scale $g$. It will of course be obvious that the style or form of graduations and the degrees of space marked upon said scale may be of any preferred style desired. Connected with the body of said level and arising within the opening, as is more fully shown in Figs. 4 and 5, are the standards $h$, provided with the bushings $i$, which loosely support the ends of the staff $k$, (see Fig. 5,) said staff carrying the hand or indicator $l$, which is thus centrally balanced and provided at its end with the weight or pendulum $m$, and, as will now be readily and clearly understood from this description, taken in connection with the drawings, the moment base $a$ of the level is moved from the horizontal position shown in the drawings, said hand or indicator $l$, by reason of its being centrally balanced and having the weight or pendulum $m$, will oscillate until said hand assumes the exact perpendicular and will point to and indicate on the graduated scale the exact degree or inclination from said perpendicular of the portion, part, or device to be leveled, the same as when the level on a horizontal plane is obtained.

In the foregoing I have simply described the level proper or that part of my invention intended for general use, as illustrated alone in Fig. 1; but the principal feature of my invention, and for which it is especially designed and intended, consists of an attachment which necessarily from its very nature has to be used in connection with and forms a part of the level, thus forming a combined level and attachment when used on engine construction for obtaining the level of the guides and also the cylinders. Said attachment consists of the main portion or body $n$, adapted to be connected to base $a$ of the level by thumb-screws $o$ in an ordinary and usual manner and clearly shown in Figs. 2, 3, and 6, a pointer $p$, the screw-threaded shank or end $q$ of which when in operative position rests in a central bore $r$, adapted to receive it, and more particularly shown in Fig. 4, a thumb-nut $s$, adapted to engage the screw-threaded shank $q$, and thus raise or lower said pointer sufficient to touch the string or cord $t$, while the ends $b$ of said level rest on the usual steel or cast-iron guides $u$, which extend longitudinally from the back cylinder-head to the guide-yoke, (see dotted lines as indicating the cord and guides in Fig. 2,) and as the combined level and attachment is moved back or forward the level of said guides, also the cylinder, by means of said cord, will thus be accurately obtained and indicated by the hand or indicator $l$ and the graduated scale $g$, and seen through glass $d$, as heretofore fully described. In Figs. 3 and 4 I have shown main portion $n$ of the attachment as having a recess or notch $v$ of sufficient size made in it, so that when connected to the base of said level it can be passed over and along, while the base of the level will rest on main guide $w$, thus giving its level.

In Fig. 6 I have shown a modified form of my attachment, which may be used, if desired, wherein two short connecting pillars or posts $x$ are employed, which leave sufficient space between for thumb-nut $s$.

Having now described my "combined level and attachment," what I claim as new and as my invention is—

1. The combination in a level with the body having a suitably-formed base the end extensions $b$, and the flange $e$, upon which is located the portion $f$ having the graduated scale $g$, of the dial and transparent disk $d$; the standards $h$ and bushing $i$; the staff $k$, the hand or indicator $l$ and pendulum $m$, all for the purpose of obtaining the exact degree of inclination of the body or portion to be leveled, substantially as described.

2. In a level the combination with the body having the base; of the dials; the supporting-standards; the hand or indicator having a weighted end adapted to act as a pendulum, thus causing said hand to oscillate; the staff of said hand or indicator; the parts having graduated scales; the attachment for engine construction having the main portion; means for removably connecting said main portion to the level proper; a pointer for obtaining the level of the cylinders of an engine; and means for raising or lowering said pointer; all substantially as described.

3. The combination in a level with the body and base extended at each end sufficiently to obtain the level of the guides of an engine; of the dials; the standards; the hand or indicator having the weighted end or pendulum; the staff; the parts having graduated scales; the attachment for engine construction having the main portion provided with a notch or recess for obtaining the level of the main guide of an engine when so desired; a pointer for obtaining the level of the cylinders of an engine; and means for detachably connecting said main portion of the attachment to the level proper; all substantially in the manner and for the purposes described.

In testimony whereof I have affixed my signature in presence of two witnesses.

HARRY J. WOLFE.

Witnesses:
   CHAS. H. CAHO,
   C. FRED DOEPKE.